(12) United States Patent
Winter

(10) Patent No.: US 7,404,937 B2  
(45) Date of Patent: Jul. 29, 2008

(54) PRODUCTION OF SYNTHETIC RUTILE BY CONTINUOUS LEACHING

(75) Inventor: John Winter, Sydney (AU)

(73) Assignee: Austpac Resources N.L., Sydney (AU)

( * ) Notice: Subject to any disclaimer, the term of this patent is extended or adjusted under 35 U.S.C. 154(b) by 525 days.

(21) Appl. No.: 10/451,075

(22) PCT Filed: Dec. 20, 2001

(86) PCT No.: PCT/AU01/01636

§ 371 (c)(1),  
(2), (4) Date: Oct. 8, 2003

(87) PCT Pub. No.: WO02/49964

PCT Pub. Date: Jun. 27, 2002

(65) Prior Publication Data

US 2004/0076578 A1    Apr. 22, 2004

(30) Foreign Application Priority Data

Dec. 20, 2000    (AU) .................................. PR2216

(51) Int. Cl.  
*C01G 23/047* (2006.01)  
*C01G 49/00* (2006.01)

(52) U.S. Cl. ........................ 423/86; 422/196; 423/27; 423/150.1; 423/150.3; 423/151; 423/610

(58) Field of Classification Search .................. 423/610, 423/86, 27, 150.1, 150.3, 151; 422/196, 422/197, 129  
See application file for complete search history.

(56) References Cited

U.S. PATENT DOCUMENTS

| 3,018,170 | A | * | 1/1962 | Soloducha | .................. | 422/196 |
| 3,497,326 | A | * | 2/1970 | Soloducha | .................. | 422/156 |
| 4,038,363 | A |   | 7/1977 | Jarish |  |  |
| 5,490,976 | A |   | 2/1996 | Rennie et al. |  |  |
| 5,885,324 | A | * | 3/1999 | Balderson et al. | ............. | 75/435 |
| 6,429,268 | B1 | * | 8/2002 | Xiongwei | .................... | 526/64 |
| 6,803,024 | B1 | * | 10/2004 | Van Dyk et al. | ............. | 423/69 |

FOREIGN PATENT DOCUMENTS

GB          2 315 742 A          2/1998

* cited by examiner

*Primary Examiner*—Wayne Langel  
*Assistant Examiner*—James Fiorito  
(74) *Attorney, Agent, or Firm*—Whitham Curtis Christofferson & Cook, P.C.

(57) ABSTRACT

A reactor 20 has a plurality of tubular downcomers 32, 34, 36, 38, 40 and risers 42, 44, 46, 48, 50, joined by sections 86, 88 in a continuous serpentine path the tubes dimensioned to provide substantially plug flow conditions for solid and liquid reagents fed into a first downcomer 24 with the products extracted from final riser 52. The reactor 20 is designed for a desired residence time by the number, height and diameter of the tubes. The downcomers 24, 32, 34, 36, 38, 40 may include a bend to improve residence time and to thereby reduce the number of tubes required for a desired overall residence time. The reactor 20 can be used in a leaching operation for producing synthetic rutile, where a pre-treated feedstock including ilmenite, leueoxene or titania slag is leached with hot HCl.

17 Claims, 4 Drawing Sheets

PRODUCTION OF SYNTHETIC RUTILE BY CONTINUOUS LEACHING

FIELD OF THE INVENTION

The present invention relates to a reactor suitable for the production of synthetic rutile from a feedstock containing iron and titanium and in particular relates to a method and apparatus for producing synthetic rutile using continuous leaching in a substantially vertical co-current tubular reactor. The invention relates to feedstock including ilmenite, leucoxene and titania slag.

BACKGROUND OF THE INVENTION

Titanium dioxide is widely used as a white pigment in paints, plastics and paper. Two types of titanium dioxide are produced, namely rutile and anatase.

There are two commercial processes for the production of titanium dioxide pigment, namely the sulfate process and the chloride process. The sulfate process is capable of using a feedstock with a relatively low titanium dioxide content, such as ilmenite. However, the capital costs of a modern sulfate process can be higher than that of an equivalent chloride process plant. Furthermore, there is a higher volume of waste products to be treated and disposed of in the sulfate process due to the use of a more impure feedstock and the fact that the sulfuric acid used in the process cannot be readily recovered and recycled.

Accordingly, the chloride process is now a more common process and is growing relatively more rapidly than the sulfate process. However, the feedstock suitable for use in the chloride process usually needs to have a higher titanium dioxide content and to contain fewer impurities than those which are suitable for the sulfate process.

Titanium dioxide is commonly found in nature in the form of ilmenite ($FeO.TiO_2$) which may contain from 40% to 80% titanium dioxide, higher grade feedstock also being referred to as leucoxene. Titanium dioxide is also found in nature as a mineral rutile, in which form it has been extensively mined as a feedstock for the chloride process. Deposits of other titanium bearing feedstock have been discovered but because of the grade or technical difficulties have not yet been commercially exploited.

Naturally occurring ilmenite is sometimes used in the chloride process but its low titanium dioxide content coupled with the need to dispose of excessive quantities of chloride waste has meant that its use has been limited.

Processes have been developed with the aim of upgrading the titanium dioxide content of ilmenite to a value approaching the equivalent of natural rutile. These processes involve treatment of the ilmenite to remove the iron fraction from the ilmenite by leaching. The first stage of such treatment is the potentiation of the ilmenite to make it more susceptible to leaching. Such potentiation treatments include the partial reduction of the iron fraction in the ilmenite; pre-oxidation of the ilmenite feed followed by partial reduction of the iron fraction in the ilmenite; reduction of the iron fraction to the metallic state, such as the Becher process or smelting of the feedstock. "Potentiation" of the feedstock is understood to create pores, passages, voids or similar spaces in the body of the material as well as convert the iron component to a more readily leachable oxidation state whereby chemical action by acid is enhanced.

Once the feedstock has been prepared leaching is then carried out. Several leaching procedures are known in the prior art among which are the following:

1. Leaching in a batchwise process in rotating spherical pressure vessels at an elevated temperature to enhance the reaction rate; one such process is known as the Benilite process;
2. Leaching in vertical cylindrical liquid/solid fluidised bed reactors; one such process is the Laporte process;
3. Leaching in staged vertical fluidised cylinders, in such a manner that the leach liquid flows continuously from one stage to another in a counter current fashion whilst the solids are fed and removed in a batchwise manner in a single stage cylinder; one such process is the Tiomin Synthetic Rutile (TSR) process.

SUMMARY OF THE INVENTION

The present invention seeks to overcome disadvantages evident in the prior art or to provide an alternative thereto.

According to a broad aspect of the invention there is provided a reactor for reacting. liquid and solid reagents, said reactor including a plurality of substantially vertical tubes inter-connected in a continuous manner; input means for inputting liquid and solid reagents; output means for outputting solid and liquid products from an end of said plurality of tubes; said output means being at a lower hydrostatic pressure than said input means whereby flow is driven from said input means to said output means; said flow being under substantially plug flow conditions.

Preferably the reactor includes a plurality of substantially vertical downcomers and risers connected in series with the diameter of successive substantially vertical downcomers and risers arranged such that the solids are transported along the length of the reactor under substantially plug flow conditions.

Preferably plug flow is achieved by ensuring that the superficial velocity of the liquid phase is less than the settling velocity of the solid phase in a given downcomer and with these respective velocities reversed in a next sequential riser.

Preferably, the number of successive downcomers and risers is such as to provide sufficient residence time in the reactor whereby the reaction performed therein goes to a satisfactory or desired conclusion.

Alternatively, the downcomers may include one or more bends, or zig-zags to provide compensation for the faster settling rate of larger particles in the solid reagent. This feature allows a wider range or spectrum of material sizes in the solid reagent to be processed, a higher riser velocity to minimise the potential of blockages; and a larger pipe diameter for any given downcomer to increase residence time therein. The latter factor in turn means that the overall pipe length of the reactor can be reduced including reducing the number of columns needed to provide a given overall residence time.

According to one aspect of the invention there is provided a method for the production of synthetic rutile from feedstock including ilmenite, leucoxene or titania slag including the steps of:

roasting the feedstock to enhance its leachability;
leaching said roasted feedstock in hot acid in a continuous manner in a substantially vertical co-current tubular reactor under substantially plug flow conditions.

Preferably, the roasted feedstock is cooled under anaerobic conditions before undergoing a magnetic treatment to separate non or very weakly magnetic gangue minerals from the roasted feedstock prior to leaching.

According to another aspect of the invention there is provided a method for the production of synthetic rutile from feedstock including ilmenite, leucoxene or titania slag including the steps of:

roasting the feedstock to enhance its leachability;
cooling the roasted feedstock under anaerobic conditions;
magnetically separating the cooled feedstock from any non or very weakly magnetic gangue mineral;
leaching said separated feedstock in hot acid in a continuous manner in a co-current substantially vertical tubular reactor under substantially plug flow conditions.

Preferably the feedstock is roasted in a multi-step process so as to oxidise the feedstock at a temperature in excess of 600° C. for at least 30 minutes whereby the iron present in the feedstock or at least a substantial portion thereof is converted from the divalent state to the trivalent state and subsequently reducing the thus oxidised feedstock in a separate stage at a similar temperature for at least 10 minutes so as to convert a substantial portion of the iron from the trivalent state to the divalent state.

Preferably, the roasted feedstock is cooled to below 200° C. so as to prevent re-oxidation spontaneously, or on exposure to the atmosphere. Preferably, the acid used in the leaching stage may comprise a mineral acid but preferably includes sulfuric acid or hydrochloric acid or in particular hydrochloric acid of superazeotropic strength.

Preferably, after leaching, the solid product is subjected to filtration, drying, calcination and magnetic separation.

Preferably, the leaching step is carried out with hot acid that is at a temperature near to the boiling point for the acid and at substantially atmospheric pressure at both the feed and discharge ends of the reactor.

According to a further aspect of the invention there is provided an apparatus for production of synthetic rutile from titaniferous feedstocks which have been potentiated for leaching, said apparatus including a reactor for reacting liquid and solid reagents, said reactor including a plurality of substantially vertical tubes interconnected in a continuous manner; means for inputting leaching reagent and potentiated feedstock; means for outputting solid and liquid products from an end of said plurality of tubes; said output means being at a lower hydrostatic pressure than said input means whereby flow is driven from said input means to said output means; said flow being under substantially plug flow conditions. Preferably said leaching reagent is maintained at an elevated temperature close to the boiling point thereof and at atmospheric pressure.

Preferably, the reactor includes a plurality of substantially vertical downcomers and risers connected in series with the diameter of successive substantially vertical downcomers and risers arranged such that the solids are transported along the length of the reactor under substantially plug flow conditions. Preferably, this is achieved by ensuring that the superficial velocity of the liquid phase is less than the settling velocity of the solid phase in a given downcomer and with these respective velocities reversed in a next sequential riser. Superficial velocity refers to the velocity of the liquid phase averaged across the diameter of the tube. In this way the rates of forward movement through the reactor of the liquid and solid reagents are averaged out to a similar value while allowing a differential movement between these reagents in a given downcomer or riser. The number of successive downcomers and risers is such as to provide sufficient residence time in the reactor whereby the reaction goes to a satisfactory or desired conclusion.

Preferably, the diameter of any downcomer is not less than the diameter of an adjacent riser and the diameter of successive downcomers or risers in the leach train is never decreasing. That is, successive downcomers or risers have diameters not less than that of the immediately preceding downcomer or riser respectively in the train.

Preferably, the vertical tubes in the train are of equal height except for the first downcomer and the last riser.

Alternatively, the downcomers may include one or more sections or bends, or zig-zags which depart from a substantially vertical path to provide compensation for the faster settling rate of larger particles in the solid reagent. This feature allows a wider range or spectrum of material sizes in the solid reagent to be processed, a higher riser velocity to minimise the potential of blockages and a larger pipe diameter for any given downcomer to increase residence time therein. The latter factor in turn means that the overall pipe length of the reactor can be reduced including reducing the number of columns needed to provide a given overall residence time. The sections or bends may be angular or curved and may be made up of more than one component involving more than one change of flow path. For example, a single section may direct the flow sideways before returning to a substantially vertical path or a pair of angular sections may temporarily divert the flow sideways before returning the flow to a substantially vertical path. Alternatively, the bend may comprise three sections, the first and last of which direct the flow sideways joined by a substantially vertical middle section. It is also contemplated that the section may be spiral.

Preferably, the downcomers and risers are interconnected by tubing which substantially ensures that reactant or product solids do not aggregate at any point of the train but move progressively from beginning to end thereof.

Preferably, provision is made at the top of each downcomer for venting gases.

Preferably the tubes are made of acid resistant material.

BRIEF DESCRIPTION OF THE DRAWINGS

Preferred embodiments of the invention will now be described with respect to the following figures in which.

PREFERRED MODES FOR PERFORMING THE INVENTION

Figure 1:
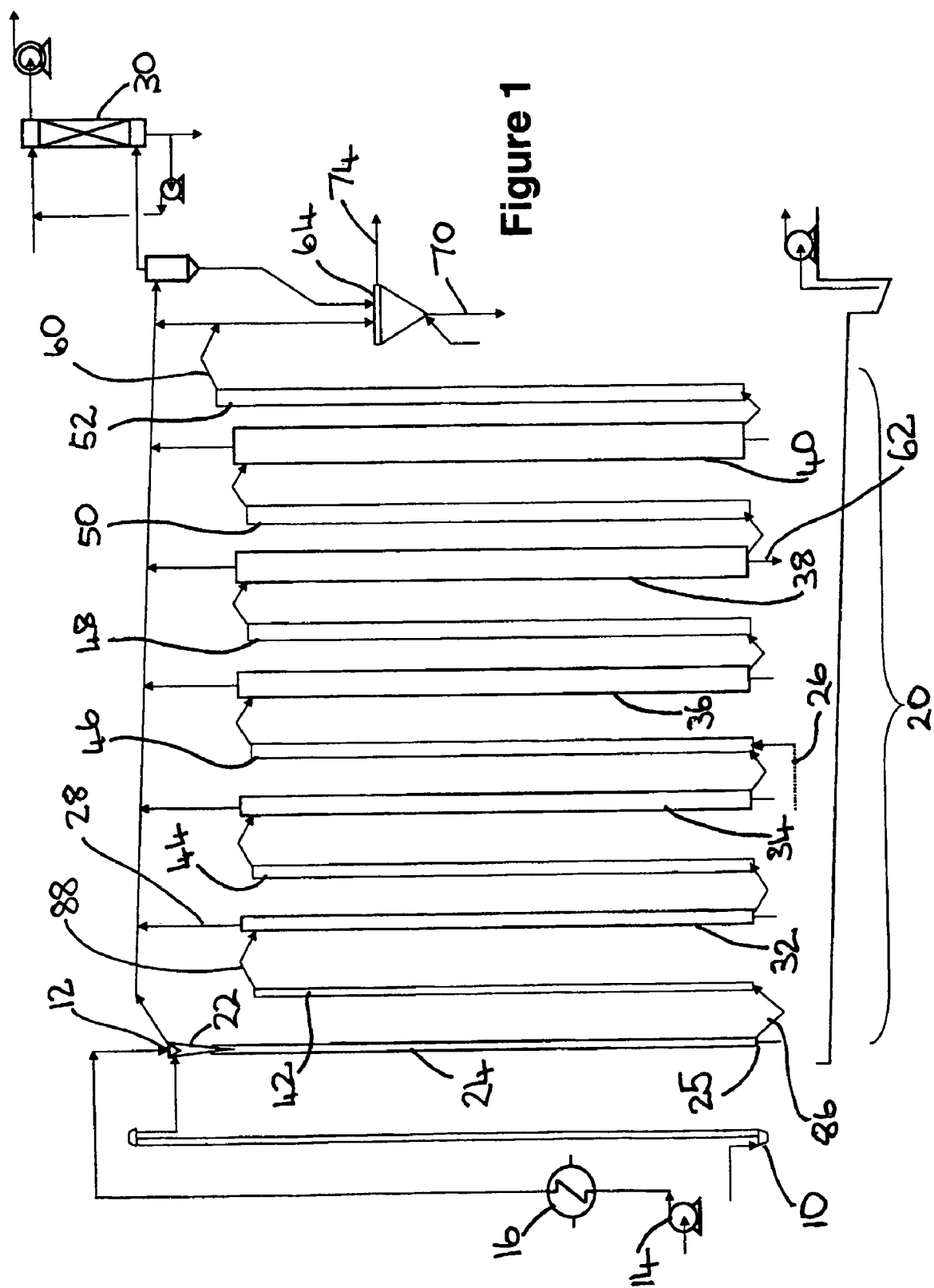
FIG. 1 shows in schematic form a first embodiment of a reactor according to the invention.

One method to potentiate a titanium bearing feedstock comprising either ilmenite, leucoxene or titania slag involves converting substantially all of the iron fraction of the feedstock into the divalent form. This usually takes a multi-step process of first oxidising the feedstock so that the iron fraction is converted by oxidation to the trivalent form which is then reduced to the divalent form. The oxidation reaction oxidises any metallic and most of the divalent iron present in the titanium bearing feedstock to the trivalent state, a proportion of which migrates to the surface of the grains. The oxidation step involves the following chemical reaction:

$$2FeO + \tfrac{1}{2}O_2 \rightarrow Fe_2O_3$$

This reaction is normally carried out using air as the oxidant, although an oxygen enriched atmosphere could also be used.

Oxidation is preferably conducted at a temperature in excess of 600° C. in a single or a multi-stage fluid bed reactor although other forms of reactor such as a rotary or a multi-hearth kiln may be used.

The oxidised material is then reduced in an atmosphere containing carbon monoxide and/or hydrogen according to the following chemical reactions:

$$Fe_2O_3 + CO \rightarrow 2FeO + CO_2$$

$$Fe_2O_3 + H_2 \rightarrow 2FeO + H_2O$$

The reduction is also preferably conducted at a temperature in excess of 600° C. in a single or multi-stage fluid bed reactor although other forms of reactor may be employed such as for example a rotary or multi-hearth kiln. A variety of fuels may be used in both the oxidation and reduction operations including solid, liquid or gaseous fuels. In the oxidation reaction an excess of oxygen is employed whilst in the reduction reaction carbon monoxide and/or hydrogen is employed in excess of the stoichiometric requirement.

The activated or potentiated feedstock leaving the reduction roaster is cooled under anaerobic conditions to below a temperature whereby re-oxidation cannot occur spontaneously, or on exposure to the atmosphere. Any oxidation of the feedstock at this point would tend to inhibit the efficiency of the subsequent leaching stage.

The potentiated and cooled feedstock is subjected to a magnetic separation to remove most of any residual gangue minerals as well as any unburnt char from the roasting.

The clean potentiated feedstock is then leached in hydrochloric acid to remove the predominant iron oxide content according to the chemical formula:

$$FeO + 2HCl \rightarrow FeCl_2 + H_2O$$

Any other minor metallic oxides which are associated will also be removed by similar reactions.

During leaching the solids are in contact with an excess of acid required to dissolve the iron and any other oxide impurities. The time required for leaching is dictated by the efficacy of the potientation stage, the temperature used for the reaction, the acid strength and composition of the potentiated feedstock.

The leaching reaction may be carried out just below the boiling point at atmospheric pressure, or under elevated pressure and temperature. The hydrochloric acid feed should preferably be above 18% w/w strength and below 35% w/w strength. The higher the value between these limits the shorter the leaching cycle times. In usual practice, the bulk of the hydrochloric acid feed will be derived from an acid regeneration plant capable of producing acid at a nominal strength in excess of 21% w/w, that is, in the superazeotropic range. For example, one such acid regeneration process is described in Australian Patent 659,535.

Following the leach procedure the liquor and leach solids are separated in a liquid-solid separation procedure. The solid material is washed, dried and calcined at a temperature sufficiently high to remove residual hydrochloric acid and to harden the particles. Ideally the calcination temperature will be no lower than 300° C.

In accordance with the invention, the leaching is carried out in a substantially vertical leach reactor under co-current substantially plug flow conditions. Such a reactor is illustrated with respect to FIG. 1. The potentiated feedstock, which, according to the preferred embodiment, is feedstock which has been oxidised and then reduced so that the iron content thereof is substantially in the divalent state, is fed via line 10 to the start 12 of the leaching train 20 of the reactor along with hydrochloric acid via pump 14. The acid is of typical strength 280 g/L and is mixed with the potentiated feedstock 10 at 22 before entering the inlet of the first downcomer tube 24. The proportion of each of the solid and liquid feeds is adjusted such that when the reaction is complete the acid is in excess of that required by stoichiometry and typically assumes a value in the spent leach liquor of between approximately 30-100 g/L HCl depending on the composition of the feedstock used.

The acid feed is heated typically to 90° C. or greater by passage through steam heat exchanger 16, which heats the acid before being fed to the start 12 of the leaching train 20 of the reactor wherein the initial rapid and exothermic reaction will raise the mixture to the operating temperature of the reactor, which is just below the boiling temperature of the liquid, typically 100-112° C. Thereafter the temperature is maintained throughout the leaching train 20 by insulating the downcomers and risers and, as required, heating them, for example, by the injection of steam, or by other methods of heating, as shown at mid-point 26, or as required elsewhere in the leaching train 20. Any non condensing vapours generated during the reaction and any entrained air are both vented to a scrubber 30 via vent lines 28 which are located at high points of the downcomers 32, 34, 36, 38, 40 of the leaching train 20.

The inlet 12 of the reactor is located at a sufficient height above the discharge point 60 to provide the necessary hydraulic head to drive both the liquid and the solids through the train 20 and to discharge to the filtration stage (not shown) without the need for assistance from any intermediate pumping stages. Alternatively, to supplement the hydraulic head and assist movement of solids and liquids through the train 20, the acid 14 could be fed to the mixer 22 under pressure. The flow rate of the combined liquid and solids mixture combined with the diameter of the first tube 24, the first downcomer, is such that the velocity of the liquid phase is less than the settling velocity of the solid phase therein. In this manner, the solid phase will have an average velocity equal to the sum of the liquid velocity and the settling velocity of the solids. This condition will result in an accumulation of solids at the bottom 25 of the downcomer 24. In the second tube 42 of the train 20, the first riser, the diameter of the tube is less than the diameter of the preceding downcomer 24 such that the respective difference in velocity of the liquid and solid phases are reversed to those pertaining in the preceding downcomer 24. Thereby, any accumulation of solids occurring in the base 25 of the downcomer 24 is effectively disbursed into the subsequent riser 42. In this manner, the average residence time of the liquids and solids is maintained equally throughout the leaching train 20, thereby substantially achieving plug flow.

The number of successive downcomers 24, 32, 34, 36, 38, 40 and risers 42, 44, 46, 48, 50, 52 is provided in an overall train 20 to provide sufficient residence time for the reaction to reach a satisfactory or desired conclusion. Because the reaction at the start 12 of the train 20 is comparatively rapid and progressively slows as it continues to the discharge point 60, it is also convenient to provide an increasing enlargement of the diameter of successive downcomers and successive risers to retard the residence time. This is made possible because the density and viscosity of the liquid phase is increasing as the reaction proceeds whilst the density of the solids is simultaneously decreasing, that is, the velocity of the liquid phase can be progressively diminished because the settling velocity of the solid phase is being simultaneously reduced.

Gangue minerals, for example chromite and garnet which normally constitute only a small proportion of the feed, remain unreacted in hydrochloric acid and therefore their particle density will not change as does that of the other solids during the progress of leaching. In some circumstances, this may result in an accumulation of a proportion of gangue mineral particles at the bottom of successive downcomers of the train 20, and provision may be made for them to be purged from the reactor, for example, toward the middle 62 of the train 20 or elsewhere as required. Alternatively, agitation of the solids, for example by mechanical pulsing of the liquid, may be used to advance these solids.

The design of the leaching train 20 is such that the movement of both solid and liquid phases is essentially "plug flow", this being a desirable trait in a continuous reaction system as employed in the current invention. In plug flow substantially no back mixing occurs. This also means that only a very gentle movement of the solid phase occurs, which avoids the application of excessive shear forces that would otherwise degrade the product by size attrition. This is an important factor because the product, synthetic rutile, is intended for later use in a fluid bed chlorinator, where the presence of excessive fines could be deleterious.

At the discharge 60 of the leaching train 20, the liquid-solids mixture is fed to a thickener 64, the thickened underflow 70 of which discharges to a filter (not shown) so that the solids thereon may be washed with water to remove excess acid and dissolved salts. The overflow 74 of the thickener 64 is discharged and pumped to an acid regeneration plant for conversion back to hydrochloric acid, which, when regenerated, is re-circulated to the leaching plant.

Acid and potentiated feedstock are preferably added to the start 12 of the reactor in a continuous manner and extracted from the outlet or discharge point 60 equally continuously.

Figure 2:
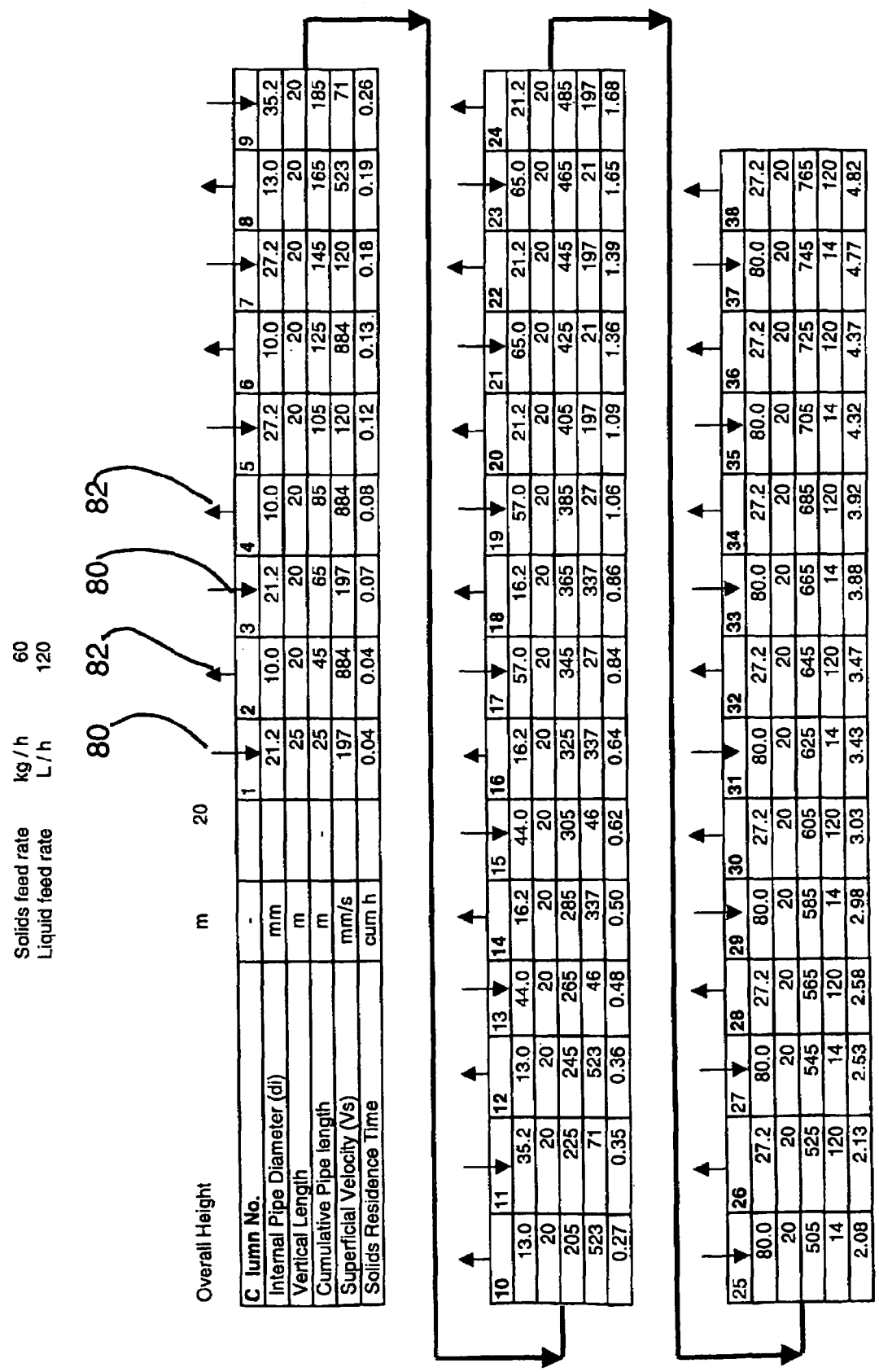
FIG. 2 shows a table of parameters for implementing the embodiment of FIG. 1 according to the invention.

Referring to FIG. 2 a table of the relevant parameters for a 38 tube pilot scale leaching train 20 is listed. Successive downcomers 24, 32 are identified by arrows 80 while successive risers are identified by arrows 82. Thus it can be seen from the table that, in this embodiment, the pipe length or height for successive downcomers and risers except for the first downcomer is maintained at approximately 20 metres, the first downcomer having a length or height of 25 metres. The diameter of successive downcomers and the diameter of successive risers is shown to have a general increase from the beginning of the train to the end of the train. Some tubes may have similar characteristics to those of the preceding respective downcomer or riser. The solids residence time 100 is a cumulative measure of the time spent at the end of each additional successive downcomer or riser and progressively increases from a time of 0.04 hours after the first downcomer, to a total time of 4.82 hours after passing through the entire leaching train of 38 columns.

Obviously, the height, diameters and numbers of downcomers and risers that may be used in a leaching reactor according to the invention will depend upon the potentiated feedstock which is employed, the strength of the acid and the desired production rate.

The connections 86, 88 (see FIG. 1) between successive downcomers and risers is such as to promote the flow of liquid and solids between successive substantially vertical tubes of the train. An inter-connection which promotes turbulent flow is preferred, for example, an inter-connection having a sharp change of direction between each successive downcomer and riser or each successive riser and downcomer in the train.

A leaching reactor can be designed for a particular solids settling velocity to accommodate the characteristics of a particular feedstock.

Figure 3:
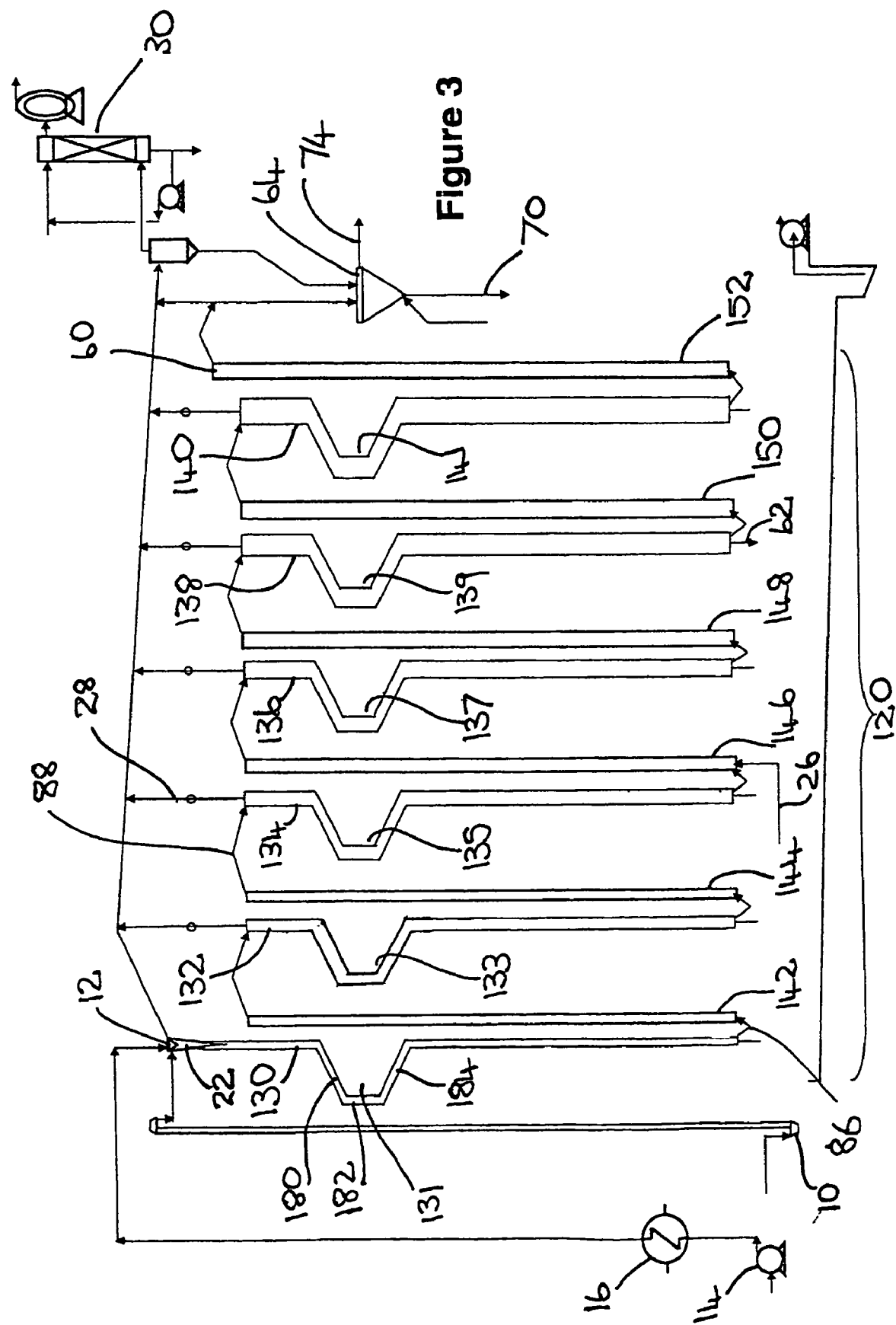
FIG. 3 shows in schematic form a second embodiment of a reactor according to the invention.
Figure 4:
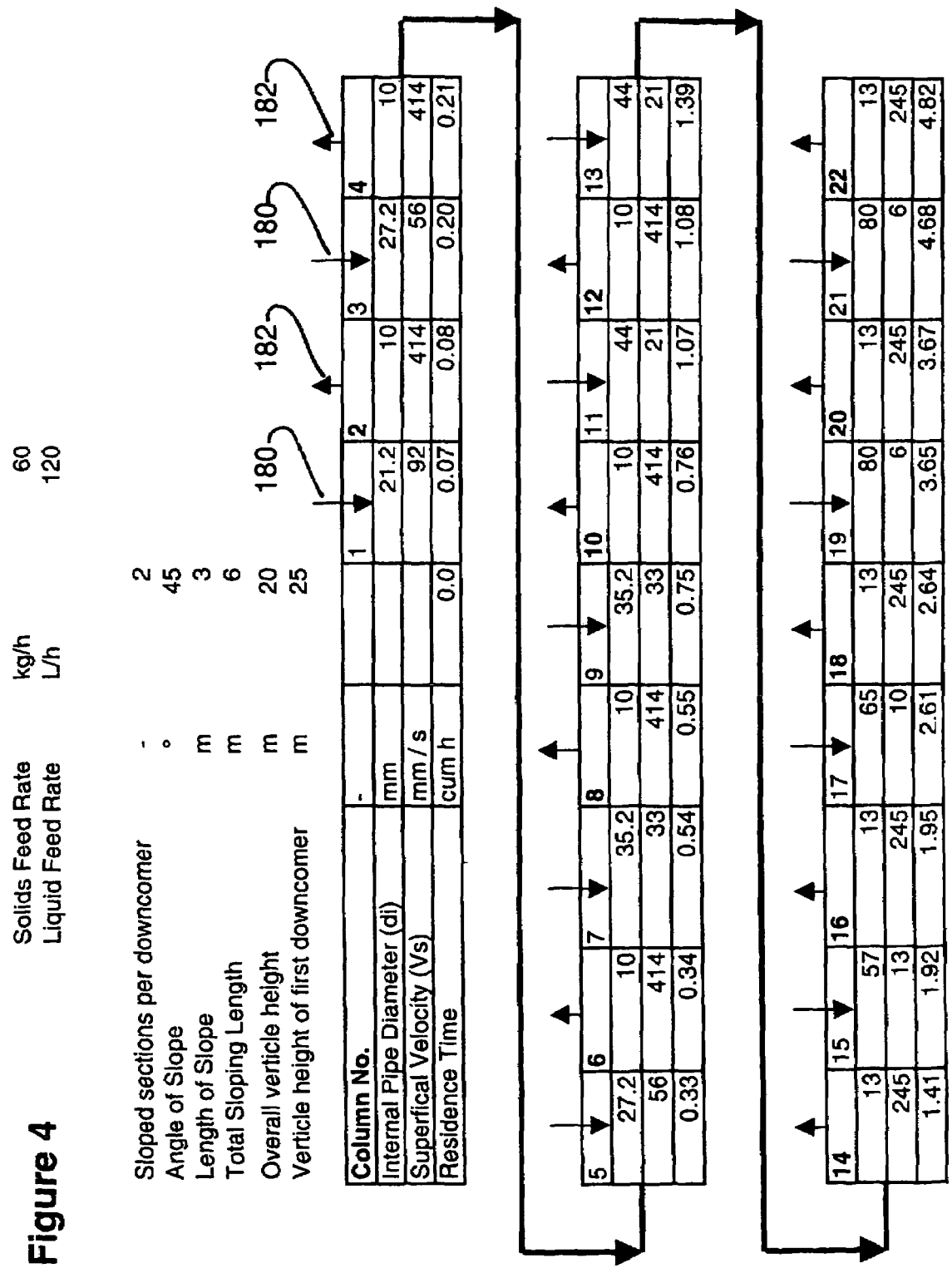
FIG. 4 shows a table of parameters for implementing the embodiment of FIG. 3.

A second embodiment will now be described with respect to FIG. 3 and FIG. 4. In this embodiment the reactor 120 includes a train of downcomers 130, 132, 134, 136, 138, 140 and alternating subsequent risers 142, 144, 146, 148, 150, 152 joined into a serpentine path at the bottom (downcomer to riser) and top(riser to downcomer) sequentially. Features of the embodiment of FIG. 3 similar to those of the embodiment of FIG. 1 are identified by the same reference numerals. FIG. 3 is a schematic and shows only 12 columns for the purpose of illustration. FIG. 4 shows a table of parameters for a leach train of this type wherein 22 columns are used to provide a residence time equivalent to the previous embodiment.

Referring to FIG. 3, each downcomer 130, 132, 134, 136, 138, 140 has a bend 131, 133, 135, 137, 139, 141 each bend being made up from three sections. Referring to the first downcomer 130, as a typical example the bend 131 has a first section 180 which extends sideways away from the vertical path of the downcomer 130 at an angle of 45° joining onto a vertical second section 182 which in turn joins onto a third section 184 returning the flow path to the substantially vertical path 186 of the downcomer 130 at an angle of 45°. Similarly, each bend of the subsequent downcomers 132, 134, 136, 138, 140 is made up of 3 sections with the only difference being in the diameter of the tubing forming both the bend and the downcomer as was the case for the downcomers for the embodiment of FIG. 1, that is, the diameter of a given downcomer is greater than or equal to the diameter of the preceding downcomer. Parameters for a reactor having a residence time of 4.82 hours, which is equivalent to the residence time of the embodiment of FIG. 1, are shown in FIG. 4. It can be seen that only 22 downcomers and risers are needed, compared to 38, to achieve this residence time.

The bend may be positioned at any part of the downcomer, or in some embodiments more than one bend may be employed in a downcomer. The parameters for a downcomer are indicated in a column marked by a down arrow 180 and for a riser by an up arrow 182. In this embodiment, the overall pipe height for successive downcomers and risers except for the first downcomer is also maintained at approximately 20 metres with the first downcomer having an overall height of 25 metres to provide a hydrostatic pressure head. Alternatively, the first downcomer may have an overall height of 20 metres, much the same as for the other successive downcomers, with the hydrostatic pressure head provided by a pump.

In the embodiment shown the bend is made in three linear sections. It is also contemplated that the "bend" may have one, two or some other number of linear sections or may be curved or spiral.

Although the invention has been described above with respect to preferred embodiments thereof variations therein are contemplated within the knowledge of a person skilled in the art. For example, instead of the multi-step oxidation and reduction process for potentiating the feedstock described above, another process may be used, within the knowledge of a person skilled in the art, for preparing the feedstock for leaching.

It is also contemplated that a person skilled in the art could apply the invention to leaching or biological reactions in areas not related to the treatment of titania bearing feedstocks, such as, for example:

1. The extraction of copper or gold or other metalliferous materials from suitably comminuted feedstocks and compatible leachants.
2. The extraction of biologically derived materials such as, for example, gelatin or in fermentation.

Such other potential uses are limited only by the ability of the liquid phase or leachant to suitably convey the solid phase through the train in a substantially plug flow fashion.

The invention claimed is:

1. A method for the production of synthetic rutile from feedstock including ilmenite, leucoxene or titania slag including the steps of:
    roasting the feedstock to enhance its leachability;
    leaching said roasted feedstock in hot acid in a continuous manner in a substantially vertical co-current tubular reactor under substantially plug flow conditions.

2. A method for the production of synthetic rutile from feedstock including ilmenite, leucoxene or titania slag including the steps of:

roasting the feedstock to enhance its leachability;

cooling the roasted feedstock under anaerobic conditions;

magnetically separating the cooled feedstock from any non or very weakly magnetic gangue mineral;

leaching said separated feedstock in hot acid in a continuous manner in a co-current substantially vertical tubular reactor under substantially plug flow conditions.

3. A method for the production of synthetic rutile from feedstock including ilmenite, leucoxene or titania slag as claimed in claim 1, wherein the feedstock is roasted in a multi-step process so as to oxidise the feedstock at a temperature in excess of 600° C. for at least 30 minutes whereby the iron present in the feedstock or at least a substantial portion thereof is converted from the divalent state to the trivalent state and subsequently reducing the thus oxidised feedstock in a separate stage at a similar temperature for at least 10 minutes so as to convert a substantial portion of the iron from the trivalent state to the divalent state.

4. A method for the production of synthetic rutile from feedstock including ilmenite, leucoxene or titania slag, as claimed in claim 2, wherein the roasted feedstock is cooled to below 200° C. so as to prevent re-oxidation on exposure to the atmosphere.

5. A method for the production of synthetic rutile from feedstock including ilmenite, leucoxene or titania slag as claimed in claim 2, wherein said acid used in the leaching step includes a mineral acid including sulfuric acid or hydrochloric acid or hydrochloric acid of superazeotropic strength.

6. A method for the production of synthetic rutile from feedstock including ilmenite, leucoxene or titania slag as claimed in claim 5, further including, after leaching, the steps of filtration, drying, calcination and magnetic separation of the solid product.

7. A method for the production of synthetic rutile from feedstock including ilmenite, leucoxene or titania slag as claimed in claim 6, wherein the leaching step is carried out with hot acid that is at a temperature near to the boiling point for the acid and at substantially atmospheric pressure at both the feed and discharge ends of the reactor.

8. A method for the production of synthetic rutile from feedstock including ilmenite, leucoxene or titania slag as claimed in claim 1, wherein said hot acid is hydrochloric acid and is input to said reactor within the range 18% w/w to 35% w/w strength and at a temperature greater than or equal to 90° C.

9. A method for the production of synthetic rutile from feedstock including ilmenite, leucoxene or titania slag as claimed in claim 2 wherein the feedstock is roasted in a multi-step process so as to oxidise the feedstock at a temperature in excess of 600° C. for at least 30 minutes whereby the iron present in the feedstock or at least a substantial portion thereof is converted from the divalent state to the trivalent state and subsequently reducing the thus oxidised feedstock in a separate stage at a similar temperature for at least 10 minutes so as to convert a substantial portion of the iron from the trivalent state to the divalent state.

10. A method for the production of synthetic rutile from feedstock including ilmenite, leucoxene or titania slag as claimed in claim 2, wherein said reactor includes a plurality of substantially vertical tubes inter-connected in a continuous manner; input means for inputting leaching reagent and said potentiated feedstock; output means for outputting solid and liquid products from an end of said plurality of tubes; said output means being at a lower hydrostatic pressure than said input means whereby flow is driven from said input means to said output means; said reactor being configured to maintain said flow under substantially plug flow conditions.

11. A method for the production of synthetic rutile from feedstock including ilmenite, leucoxene or titania slag as claimed in claim 1 or 2, wherein said hot acid is hydrochloric acid and is input to said reactor within the range 18% w/w to 35% w/w strength and at a temperature greater than or equal to 90° C.

12. A method for the production of synthetic rutile from feedstock including ilmenite, leucoxene or titania slag as claimed in claim 1, wherein said reactor includes a plurality of substantially vertical tubes inter-connected in a continuous manner; means for inputting leaching reagent and said potentiated feedstock; output means for outputting solid and liquid products from an end of said plurality of tubes; said output means being at a lower hydrostatic pressure than said input means whereby flow is driven from said input means to said output means; said reactor being configured to maintain said flow under substantially plug flow conditions.

13. A method for the production of synthetic rutile from feedstock including ilmenite, leucoxene or titania slag as claimed in claim 12, wherein said leaching in hot acid is maintained at an elevated temperature close to the boiling point thereof and at atmospheric pressure.

14. A method for the production of synthetic rutile from feedstock including ilmenite, leucoxene or titania slag as claimed in claim 13, wherein said hot acid is hydrochloric acid and is input to said reactor within the range 18% w/w to 35% w/w strength and at a temperature greater than or equal to 90° C.

15. A method for the production of synthetic rutile from feedstock including ilmenite, leucoxene or titania slag as claimed in claim 7, wherein said hot acid is hydrochloric acid and is input to said reactor within the range 18% w/w to 35% w/w strength and at a temperature greater than or equal to 90° C.

16. A method according to claim 12, wherein the leaching reactor includes a plurality of downcomers and risers connected alternatively in series, and wherein said downcomers have larger diameters than a diameter of adjacent risers.

17. A method according to claim 12, wherein the leaching reactor includes a plurality of downcomers and risers connected alternatively in series, and wherein a path length of said downcomers is greater than a path length of adjacent risers.

* * * * *